US009283811B2

(12) United States Patent
Kim

(10) Patent No.: US 9,283,811 B2
(45) Date of Patent: Mar. 15, 2016

(54) NON-PNEUMATIC TIRE INTEGRATED WITH WHEEL AND METHOD FOR MANUFACTURING THE SAME

(71) Applicant: Young Jin Kim, Gwangju (KR)

(72) Inventor: Young Jin Kim, Gwangju (KR)

(73) Assignee: HNC CO., LTD., Jeollabuk-do (KR)

( * ) Notice: Subject to any disclaimer, the term of this patent is extended or adjusted under 35 U.S.C. 154(b) by 0 days.

(21) Appl. No.: 13/988,974

(22) PCT Filed: Feb. 4, 2013

(86) PCT No.: PCT/KR2013/000861
§ 371 (c)(1),
(2) Date: May 22, 2013

(87) PCT Pub. No.: WO2014/115917
PCT Pub. Date: Jul. 31, 2014

(65) Prior Publication Data
US 2015/0136290 A1    May 21, 2015

(30) Foreign Application Priority Data

Jan. 23, 2013   (KR) .................. 10-2013-0007214

(51) Int. Cl.
*B60C 7/28* (2006.01)
*B60B 21/10* (2006.01)
(Continued)

(52) U.S. Cl.
CPC . *B60C 7/28* (2013.01); *B29D 30/02* (2013.01); *B60B 21/10* (2013.01); *B60B 21/104* (2013.01);
(Continued)

(58) Field of Classification Search
CPC ............ B60C 7/00; B60C 7/10; B60C 7/102; B60C 2007/005; B60C 7/28; B60C 7/22; B60C 7/24; B60B 21/10; B60B 21/104; B60B 21/106
USPC .................. 152/246, 300, 301, 302, 303, 323
See application file for complete search history.

(56) References Cited

U.S. PATENT DOCUMENTS 1,867,438 A * 7/1932 Baeck ....................... B60C 7/10
152/246
6,089,292 A * 7/2000 Hill, III ................... B60C 7/102
152/302
(Continued)

FOREIGN PATENT DOCUMENTS

JP             07205608 A      8/1995
KR          101030505 B1      4/2011

OTHER PUBLICATIONS

Mechanical translation of KR101030505, Apr. 25, 2011.*
(Continued)

*Primary Examiner* — John Walters
(74) *Attorney, Agent, or Firm* — Rothwell, Figg, Ernst & Manbeck, P.C.

(57) ABSTRACT

The present invention relates to a tire integrated with a wheel and a method for manufacturing the same, more particularly relates to a non-pneumatic tire integrated with a wheel and a method for manufacturing the same, in which elastic rubber and tread rubber are formed on a produced wheel of a vehicle in a strip to form a semi-product and then the semi-produced tire is cured so as to form the semi-produced tire with the wheel integrally, a rim corresponding to the outer peripheral surface of the wheel is formed in multiple stages, rim flanges are formed at both sides of the rim to be protruded in a T-shape so as to fix an elastic layer formed on a peripheral surface between the rim flanges, and a tread layer is covered on the upper surface of the rim flanges in order to distribute and buffer an impact transferred to the elastic layer from the ground, thereby improving the driving performance of the vehicle.

13 Claims, 7 Drawing Sheets

(51) Int. Cl.
  *B29D 30/02* (2006.01)
  *B60C 7/10* (2006.01)
  *B60C 7/24* (2006.01)
  *B60C 7/22* (2006.01)
  *B29K 23/00* (2006.01)
  *B29K 75/00* (2006.01)
  *B29K 105/06* (2006.01)

(52) U.S. Cl.
  CPC . *B60C 7/102* (2013.04); *B60C 7/22* (2013.01); *B60C 7/24* (2013.01); *B29K 2023/12* (2013.01); *B29K 2075/00* (2013.01); *B29K 2105/06* (2013.01)

(56) References Cited

U.S. PATENT DOCUMENTS 6,845,796 B2 * 1/2005 Katoh et al. ........... B29D 30/02
  152/209.1
2010/0071819 A1 * 3/2010 McCulley ............... B60C 7/105
  152/323

OTHER PUBLICATIONS

Office Action issued in Korean Patent Application No. 10-2013-0007214, dated Mar. 7, 2013, 9 pgs.

* cited by examiner

NON-PNEUMATIC TIRE INTEGRATED WITH WHEEL AND METHOD FOR MANUFACTURING THE SAME

CROSS REFERENCE TO RELATED APPLICATIONS

This application is a 35 U.S.C. §371 National Phase Entry Application from PCT/KR2013/000861, filed Feb. 4, 2013, and designating the United States, which claims priority under 35 U.S.C. §119 to Korean Patent Application No. 10-2013-0007214 filed Jan. 23, 2013, which is incorporated herein in its entirety.

TECHNICAL FIELD

The present invention relates to a tire integrated with a wheel and a method for manufacturing the same, and more particularly to a non-pneumatic tire integrated with a wheel and a method for manufacturing the same, in which synthetic resin, or elastic rubber and tread rubber is/are formed on a produced wheel of a vehicle in a strip to form a semi-produced tire and then to cure the semi-produced tire so as to integrally form the semi-produced tire on the wheel, a rim corresponding to the outer peripheral surface of the wheel is formed with multiple stages, rim flanges are formed at both sides of the rim to be protruded in T-shape so as to fix an elastic layer formed on the peripheral surface between the rim flanges, and a tread layer is covered on the upper surface of the rim flanges, so as to distribute the load transferred from the ground and to enable the elastic layer to buffer an impact, thereby improving the driving performance of the vehicle.

BACKGROUND ART

In general, a tire is manufactured through processes such as a semi-product process for producing parts respectively having quality in accordance with their property and use, a forming process for assembling different parts to form a semi-produced tire, and a curing process for curing the semi-produced tire in a mold. The manufactured tire is assembled with a separately manufactured wheel and used as a pneumatic tire.

FIG. 1 is a sectional view of a conventional tire which is manufactured by assembling a plurality of semi-produced parts and then curing the assembled semi-produced parts, and the conventional tire includes semi-produced parts, such as an inner liner 101, a carcass 102, a belt 103, a belt cushion 104, a capply 105, a tread 106, a sidewall 107, a bead 108 and a bead filler 109.

The inner liner 101 is disposed in the tire to prevent the leakage of the air. The carcass 102 is a cord layer in the tire, which is a part for supporting a load, for enduring an impact, and for having fatigue resistance to an extension and contraction movement during the driving. On the other hand, the belt 103, which is disposed between the tread 106 and the carcass 102, is made of steel wires in order to reduce outer impact and to make the tread widely contact the ground resulting in improving the driving stability. The belt cushion 104 is partly disposed between the layers of the belt. The capply 105 is a specific cord sheet disposed on the belt of a radial tire, which is a part for minimizing the movement of the belt during the driving. In addition, the tread 106 is in direct contact with the ground and provides the tire with friction force necessary for braking and driving. Therefore, the tread 106 must have excellent durability against abrasion, endure outer impact, and have a low heat generation property. The sidewall 107 is a rubber layer positioned at a side portion of the tire, which has durability against the extension and contraction movement of the tire in order to protect the carcass in the tire. The bead 108 is a bundle of wires having a square section or hexagonal section and being made of steel wires coated with rubber, which is used as a part holding and fixing the tire to the rim of the tire. The bead filler 109 is material made of rubber in order to minimize dispersion of the bead and to reduce the outer impact, resulting in protecting the bead.

As described above, the pneumatic tire made of a plurality of semi-products has disadvantages in that the tire performance can be reduced due to weight imbalance or adhesion of the semi-products, or due to heat generation caused by friction, and that the tire may be punctured during the driving to make the vehicle fail to drive consistently.

In order to improve the disadvantages of the prior pneumatic tire, a run-flat tire is developed and provided. The run-flat tire can make a vehicle drive consistently for a constant time even if the run-flat tire is punctured. Thereby, a driver can safely move the vehicle to a garage to repair the tire.

The conventional run-flat tire may have different structures. FIG. 2 is a photograph showing sections of a general pneumatic tire and a run-flat tire in which reinforced rubber is strengthened on an inner side of a sidewall of the run-flat tire, as comparing sections with each other. It can be known that the run-flat tire has a sidewall thicker than that of the general pneumatic tire in order to improve durability against an extension and contraction movement.

Furthermore, a supporting ring made of a rubber material is additionally mounted on an outer peripheral surface of the wheel in the pneumatic tire in order to temporarily endure a load applied to the wheel when the tire is punctured. On the other hand, a supporting ring made of a metal material is mounted on the inner surface of the pneumatic tire while protruding from the inside of the pneumatic tire toward the wheel, in order to temporarily endure a load applied to the wheel when the tire is punctured. Accordingly, the vehicle can be temporarily driven without damage to the wheel.

In the above mentioned run-flat tire, there are problems in that the run-flat tire has increased weight because the supporting ring made of a rubber or metal material is mounted or an additional structure is reinforced, thereby reducing a basic performance of the tire and lowering fuel efficiency during the driving of the vehicle, and in that the run-flat tire increases fatigue of important semi-products constructing the tire when the vehicle is driven in a condition of tire puncture, so as to fail to return to a state before the tire puncture, to provide abnormal performance, and to be impossible to be recycled.

The present applicant has proposed a method for manufacturing a non-pneumatic tire integrated with a wheel in Korean Patent No. 1030505 issued to the present applicant. Referring to FIG. 3, the tire 110 integrated with the wheel according to the above-mentioned Korean Patent includes a wheel 111 having a rim 112 formed thereon and rim flanges 113 protruding from both sides of the rim 112, which respectively have an end portion bent outwardly, and a tread 114 formed on the rim to cover an outer peripheral surface of the rim flange, which has a convex surface and tread patterns formed on an outer surface thereof.

The above-mentioned registered patent has advantages in that it is not concerned with a puncture of the tire because of the non-pneumatic tire having the tread integrally formed on the wheel, and in that it is possible to improve the driving performance during the driving because it is not necessary to reinforce a side rubber and to add a support ring such that the side rubber is reinforced on the run-flat tire, resulting in reducing the weight of the tire. However, the tire according to the registered patent has a disadvantage in that ride comfort can be reduced because the tread contacting with a road is formed on the wheel so as to directly transfer impact loading from the road to the wheel.

DISCLOSURE OF INVENTION

Technical Problem

Therefore, the present invention has been made in view of the above-mentioned problems, and the present invention provides a non-pneumatic tire integrated with a wheel and a method for manufacturing the same, in which an elastic layer is disposed between the wheel and a tread layer, so as to constantly absorb and transfer impact load, transferred through the tread layer, to the wheel, resulting in providing an improved ride comfort and providing both a run-flat function and a bulletproof function.

Solution to Problem

In accordance with an aspect of the present invention, there is provided a non-pneumatic tire integrated with a wheel, which includes: a wheel having rim flanges formed at both sides of a rim forming an outer peripheral surface, and coupled to an axle of a vehicle; an elastic layer formed on the rim of the wheel; and a tread layer inserted in the elastic layer and contacting a road.

The rim flanges are formed at both sides of the rim and have protrusions respectively extending from opposite sides thereof widthwise. Support grooves are formed between the respective rim flange and a rim surface. The elastic layer is formed between the supporting grooves on the rim.

Further, the rim of the wheel has a rim groove formed at the center portion of the rim which has a smaller diameter than that of the rim. Therefore, the rim surface has multi-stages so that a part of the elastic layer formed on the rim is inserted in the rim groove, thereby improving transverse supporting force of the elastic layer.

In accordance with another aspect of the present invention, there is provided a method for manufacturing a non-pneumatic tire integrated with a wheel, which includes the steps of: producing a wheel, in which a rim groove is formed at the center portion of a rim and has a smaller diameter than that of the rim, in which rim flanges respectively have protrusions extending from each side thereof widthwise, and in which a supporting groove is formed between protrusions on the rim; forming multiple layers in which a non-cured elastic layer is formed at the height to the protrusions of the rim flanges of the wheel and then a non-cured tread layer is formed to cover an upper surface of the elastic layer and the rim flanges; and curing the non-cured multiple layers in a mold.

In accordance with the other aspect of the present invention, there is provided a method for manufacturing a non-pneumatic tire integrated with a wheel, which includes the steps of: producing a wheel, in which a rim groove is formed at the center portion of a rim and has a smaller diameter than that of the rim, in which rim flanges respectively have protrusions extending from each side thereof widthwise, and in which a supporting groove is formed between protrusions on the rim; forming multiple layers in which an elastic layer is coated at the height to the protrusions of the rim flanges of the wheel before being cured; firstly curing the elastic layer in a mold; forming a tread layer to cover the cured elastic layer and the rim flanges: and secondly curing the tread layer in a mold.

Advantageous Effects

In the non-pneumatic tire integrated with the wheel and the method for manufacturing thereof according to the present invention, the elastic layer is disposed between the wheel and the tread layer to buffer impact load transferred from ground, resulting in improving ride comfort. Supporting force of the tread layer, the elastic layer and the wheel can be increased because the rim of the wheel has multi-stages in the rim surface, so that it can be prevented that the tread layer and the elastic layer are separated and removed from the wheel when the tire is pushed transversely. As mentioned above, the tire according to the present invention can improve the ride comfort and the stability of the vehicle even though it has a lower aspect ratio.

Further, in a non-pneumatic tire and a method of manufacturing the same according to the present invention, the number of the semi-produced parts is reduced to improve uniformity of the product and to simplify the manufacturing process.

BRIEF DESCRIPTION OF DRAWINGS

The foregoing and other objects, features and advantages of the present invention will become more apparent from the following detailed description when taken in conjunction with the accompanying drawings in which.

DESCRIPTION OF REFERENCE NUMERALS

Figure 1:
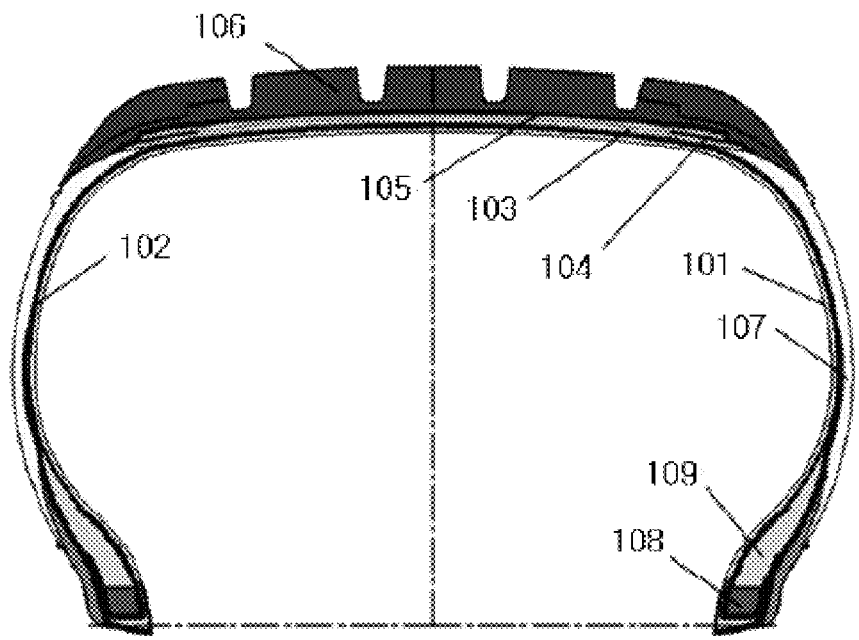
FIG. 1 is a sectional view showing a tire in which a plurality of semi-products are assembled and cured.
Figure 2:
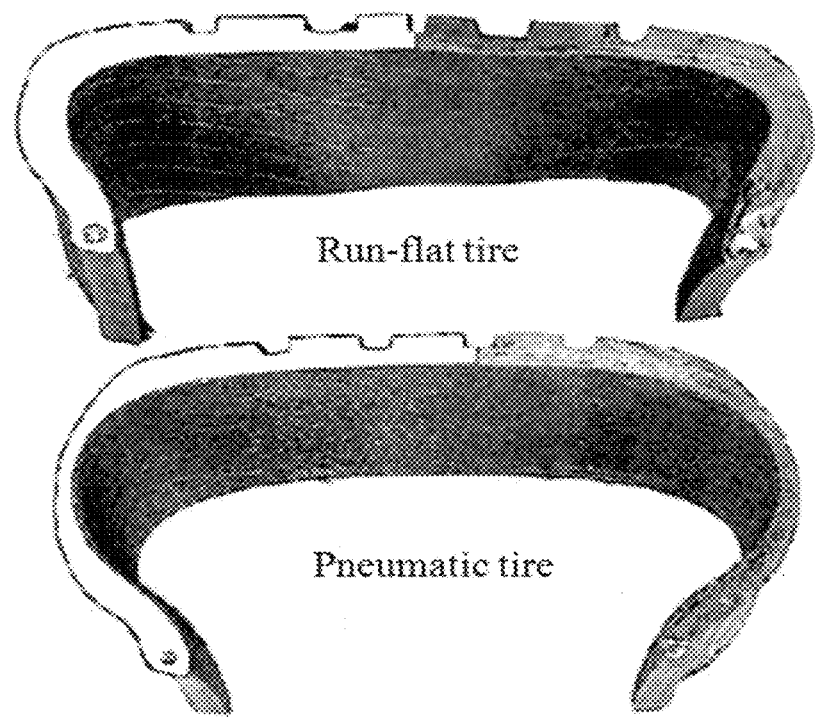
FIG. 2 is a photograph showing sections of a general pneumatic tire and a run-flat tire in which reinforced rubber is strengthened on an inner side of a side wall thereof, in order to compare with each other.
Figure 3:
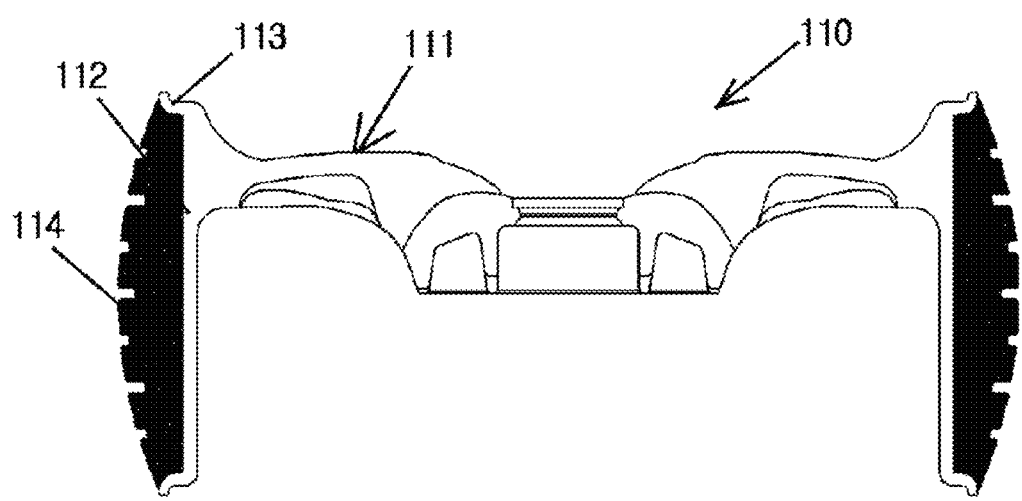
FIG. 3 is a sectional view showing a conventional tire integrated with a wheel.

10: tire integrated with wheel
20: wheel
21: hub
22: rim
23: spoke
24: rim flange
221: rim groove portion
241: protruding portion
242: supporting groove
30: elastic layer 31: intersection groove
32: elastic strip
40: tread layer
41: intersection protrusion
42: tread strip
50: intersection portion
60, 60a: mold
61: pattern protrusion
62: protrusion Mode for the Invention Hereinafter, exemplary embodiments of the present invention will be described with reference to the accompanying drawings. Although several exemplary embodiments of the present invention have been described for illustrative purposes, those skilled in the art will appreciate that various modifications, additions and substitutions are possible, without departing from the scope and spirit of the invention as disclosed in the accompanying claims.

Figure 4:
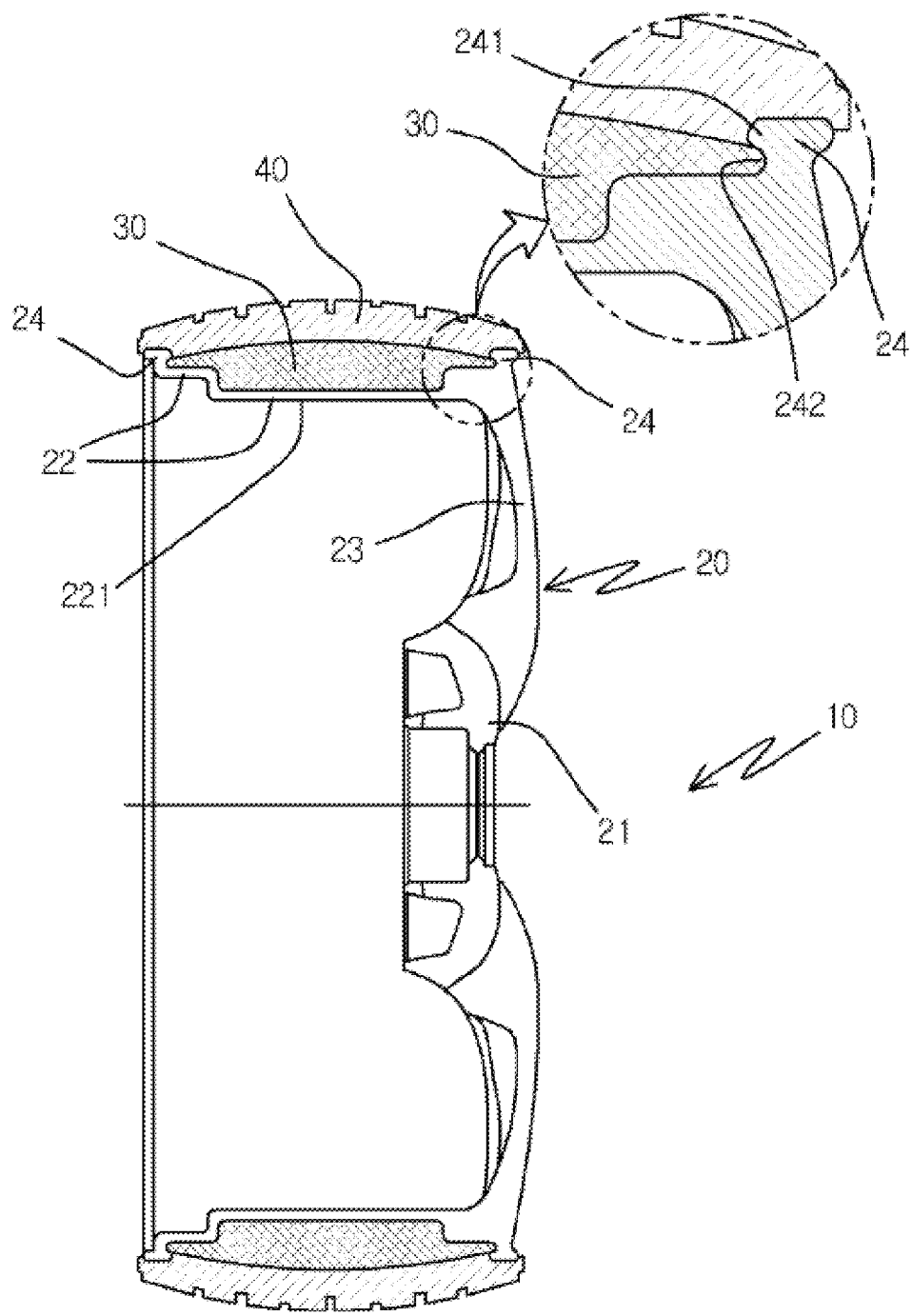
FIG. 4 is a sectional view showing a tire integrated with a wheel according to the first embodiment of the present invention.

FIG. 4 is a sectional view showing a tire integrated with a wheel according to an embodiment of the present invention. As shown in FIG. 4, the tire 10 integrated with the wheel according to the present invention includes the wheel 20 mounted on an axle of a vehicle, an elastic layer 30 formed on a rim 22 of the wheel, and a tread layer 40 formed to enclose the elastic layer 30 and contacting with a road.

The wheel 20 includes a hub 21 coupled to an axle of a vehicle, a rim 22 on which the tire 10 is mounted, and spokes 23 for connecting the hub 21 to the rim 22. According to the present invention, the rim 22 has a cylinder shape formed to be coaxial with the axle of the vehicle, while rim flanges 24 respectively protrude from each side of the rim 22 in an outward direction to the rim surface.

The two rim flanges 24 respectively include an upper portion having a flat surface, so that they can distribute a load when the tire contacts with the road. In addition, the rim flanges 24 respectively have rounded portions protruding in opposite directions at both sides of the upper portion thereof in order that the tire can contact the road in corresponding to an alignment angle when the wheel is mounted and aligned on the vehicle.

The two rim flanges 24 have a role in protecting the rim surface using the upper portion, while they respectively have a supporting groove 242 formed therein so as to improve a supporting force of the rim 22 and the elastic layer 30 formed on the rim 22. For example, referring to the enlarged part in FIG. 4, protrusions 241 are formed widthwise from the opposite inner surfaces of the two rim flanges so that they form the supporting grooves 242 together with the rim surface. Then, the elastic layer 30 is formed to extend from the rim surface to the supporting groove 242. Thus, it is possible to prevent the elastic layer from being removed from the wheel and to support the elastic layer by the wheel even though a transverse load is applied to the elastic layer. On the other hand, even if the elastic layer 30 contacting the wheel 20 is partially separated from the wheel 20, the protrusion 241 can play a role of a latch to prevent the elastic layer from being removed from the wheel.

Further, the rim 22 may have a stage formed therein to restrict a rim groove 221. The rim groove 221 is formed along with a center portion of the rim 22 and has a smaller diameter than that of both sides of the rim 22. In the rim groove, only one rim groove may be formed at the center portion of the rim as shown in FIG. 4, or a plurality of rim grooves may be formed in the rim. In addition, two or more stages may be formed on the rim in widthwise direction of the rim. However, in concern with a low aspect ratio of the tire, it is preferable to form one or two stages in a widthwise direction of the rim.

When the elastic layer 30 is coated on the peripheral surface of the rim 22 having the rim groove 221, a part of the elastic layer is inserted into the rim groove 221 so as to increase contact area between the elastic layer and the rim and to play the role of a latch. As a result, it is possible to improve a supporting force of the tire when a friction force is applied to the tire transversely.

Furthermore, the rim 22 may have protrusions with different shapes on the upper portion including the rim groove 221 so as to increase contact area between the elastic layer and itself, thereby improving the supporting capability.

The elastic layer is made from a rubber material with elasticity, or may be made from a material selected from urethane or polypropylene material which is different from the rubber material of the tread layer as described below.

As described above, the tread layer 40 is formed on the wheel to enclose the elastic layer.

The elastic layer 30 is formed on the peripheral surface of the rim 22 of the wheel, more particularly, from the peripheral surface of the rim to a lower portion of the protrusions 241 of the two rim flanges 24. Moreover, the tread layer 40 is formed to enclose the elastic layer 30 and the rim flanges 24 so that it only can contact with the road. A sort of rubber composition with excellent elasticity can be used as a material to form the elastic layer. In the case of the tread layer, it is preferable to use rubber composition with excellent durability against abrasion rather than elasticity.

Further, it is preferable to form the elastic layer 30 and the tread layer 40 so that they protrude radially from the center portion of the rim surface to have a convex shape. Here, only an elastic layer is formed to protrude convexly by increasing the thickness of the center portion of the rim, while the tread layer is formed to cover the upper surface of the convex elastic layer with a predetermined thickness. On the contrary to this, the elastic layer can be formed with the predetermined thickness while only the tread layer is formed with an increased thickness at the center portion of the rim, so that the center portion of entire layers including the elastic layer and the tread layer can protrude. Preferably, the elastic layer is formed with an increased thickness so as to provide the tire with a buffering force in relation to a load applied to the tire in different directions.

Figure 5:
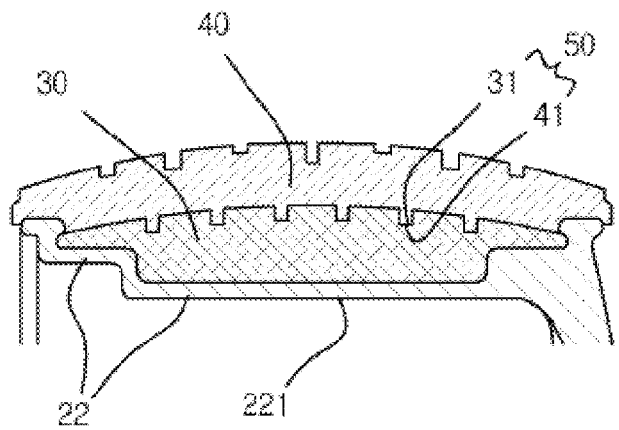
FIG. 5 is a sectional view showing a tire integrated with a wheel according to the second embodiment of the present invention, in which an intersection portion is formed between an elastic layer and a tread layer.

Moreover, the elastic layer 30 and the tread layer 40 may have an intersection portion 50 in order to increase an adhesive area. Referring to FIG. 5, the elastic layer 30 has a plurality of intersection grooves 31 formed on an upper surface thereof while the tread layer 40 has a plurality of intersection protrusions 41 formed on a lower surface thereof contacting with the elastic layer 30 to correspond to the intersection grooves 31, thereby increasing the adhesive area to improve coupling ability. Here, the intersection grooves 31 are formed in a variety of patterns such as a grid pattern, a diagonal pattern and a wave pattern, or in different shapes such as a semicircular protrusion, a cylindrical protrusion and a polygonal protrusion. The intersection protrusions 41 corresponding to the intersection grooves 41 are formed in advance or during the process of forming the tread layer in which tread rubber is inserted into the intersection grooves.

Figure 6:
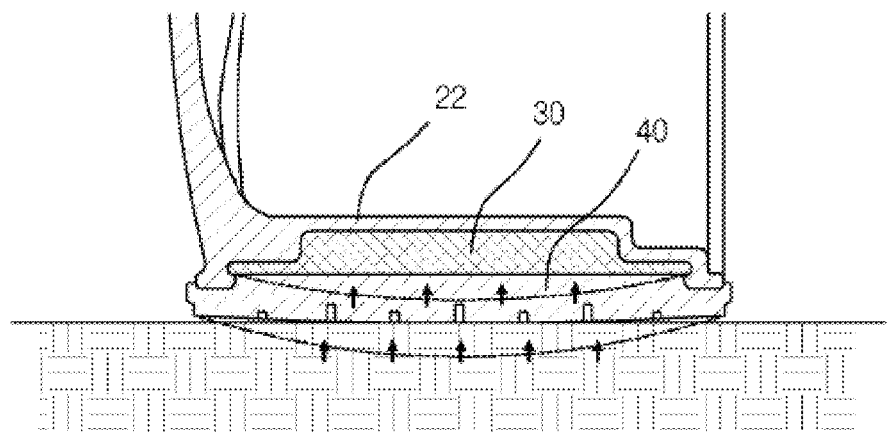
FIG. 6 is a sectional view showing a tire integrated with a wheel according to the first embodiment of the present invention, which shows an operation of an elastic layer when a load is applied to the elastic layer.

In the tire 10 integrated with the wheel as described above, the elastic layer 30 between the rim 22 and the tread layer 40 is deformed and changed in volume to achieve a buffering operation when the tire is pressed due to the weight of the vehicle or the impact load applied thereto from the road, as shown in FIG. 6.

Hereinafter, a method for manufacturing a tire integrated with a wheel according to the present invention will be described.

Figure 7:
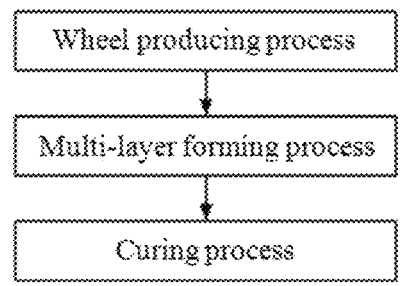
FIGS. 7 and 8 are a block diagram and a process diagram illustrating a process for manufacturing the tire integrated with a wheel according to the first embodiment of the present invention.
Figure 8:
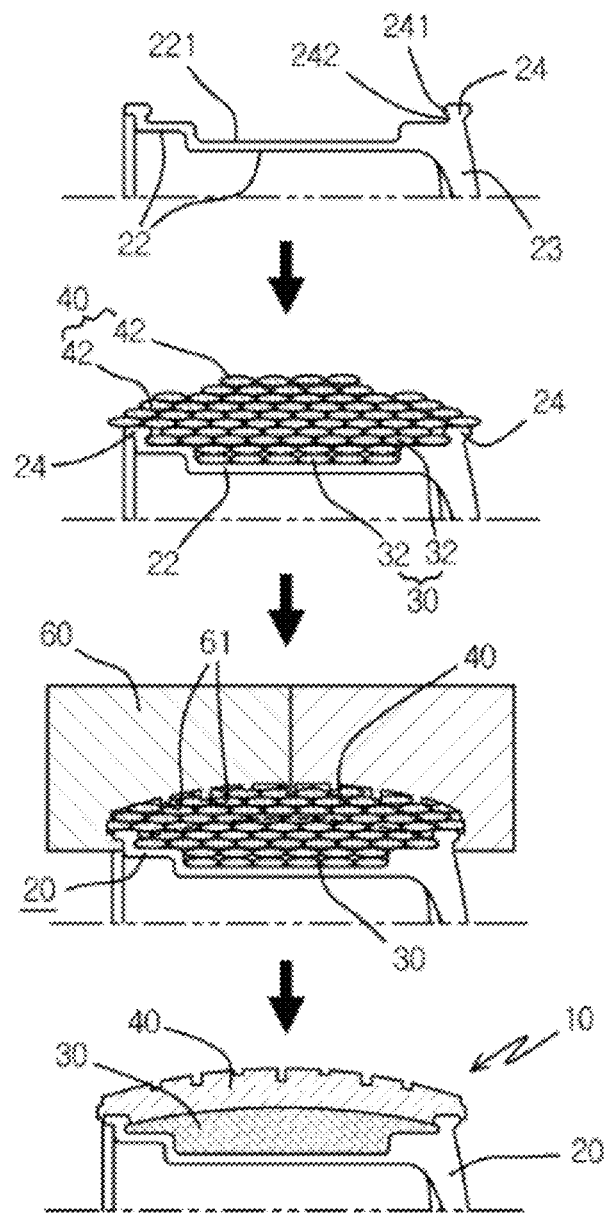

FIGS. 7 and 8 are a block diagram and a process diagram showing a method for manufacturing the tire integrated with the wheel according to the first embodiment of the present invention.

1) As shown in FIGS. 7 and 8, according to the method of the present invention, a process of producing the wheel is firstly performed. In the wheel producing process, the wheel 20 is produced as a base to form a rubber layer thereon, which includes a hub connected to a general axle, a rim 22 having tire rubber attached thereto, and spokes 23 connecting the hub to the rim. Especially, the rim 22 of the wheel according to the present invention has the rim groove 221 in which the center portion of the rim is formed with a smaller diameter than that of both sides of the rim. The rim flanges 24 are formed at both sides of the rim, which respectively have protrusions 241 extending from opposite sides. A supporting groove 242 is formed between the protrusions and the rim.

2) Then, a process is performed for forming the elastic layer 30 and the tread layer 40, which are made from one selected from elastic rubber, urethane, and polypropylene.

At the next step, an elastic strip 32 or an elastic sheet, which is not cured, is wound on the rim 22 of the produced wheel to form the non-cured elastic layer. At that time, the non-cured elastic layer is formed in such a manner that the elastic strip 32 is wound adjacent to only lower portions of the protrusions 241 of the rim flanges extending from both sides of the rim while covering the center portion of the rim convexly, so that both sides and the center portion of the elastic layer 30 have a different thickness, respectively.

When the process of winding the non-cured elastic strip to form the elastic layer 30 is completed, a non-cured tread strip or sheet 42 is wound and covered on the elastic layer 30 and the rim flanges 24 in order to form the tread layer 40, thereby sequentially forming the non-cured elastic layer and tread layer on the rim.

Moreover, the method of the present invention further includes a process for inserting or winding a steel or fabric structure before the tread rubber is wound on the elastic layer during the process of forming the tread layer 40. Then, the tread rubber is wound again so that the steel or fabric structure is positioned at an intermediate portion of the tread layer, resulting in improved structure strength.

3) Then, a process is performed for curing two layers of the elastic layer 30 and the tread layer 40, which are not cured yet and laminated, in a mold 60.

For example, the mold 60 is coupled and fixed to the wheel 20 on which the two layers are wound and then heated, so that the tire 10 integrated with the wheel are manufactured in such a manner that the non-cured materials respectively composing the elastic layer 30 and the tread layer 40 are cured on the outer peripheral surface of the rim 20.

According to the present invention, a plurality of pattern protrusions 61 is formed on an inner peripheral surface of the mold 60 which contacts with the tread layer, thereby forming the patterns on the surface of the tread layer during the curing process.

On the other hand, a tire integrated with a wheel can be manufactured according to the second embodiment of the present invention.

Figure 9:
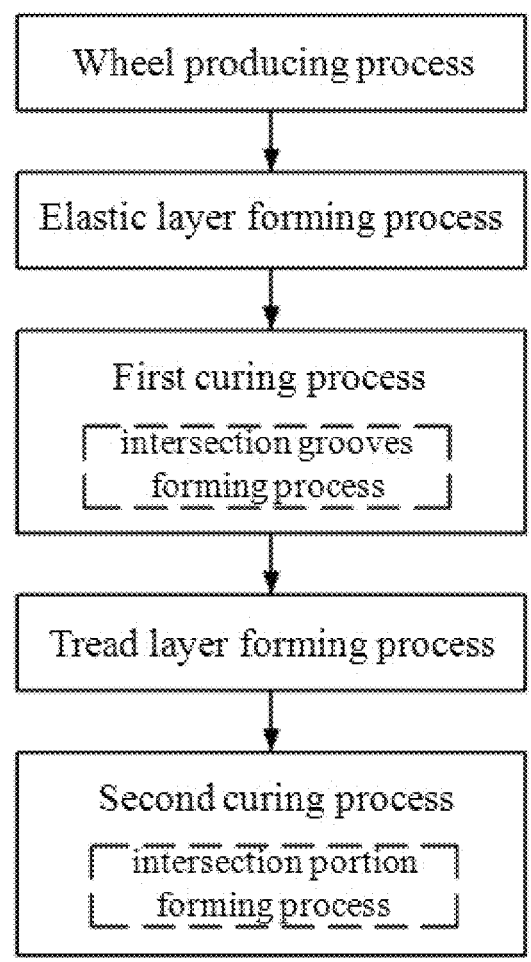
FIGS. 9 and 10 are a block diagram and a process diagram illustrating a process for manufacturing the tire integrated with wheel according to the second embodiment of the present invention.
Figure 10:
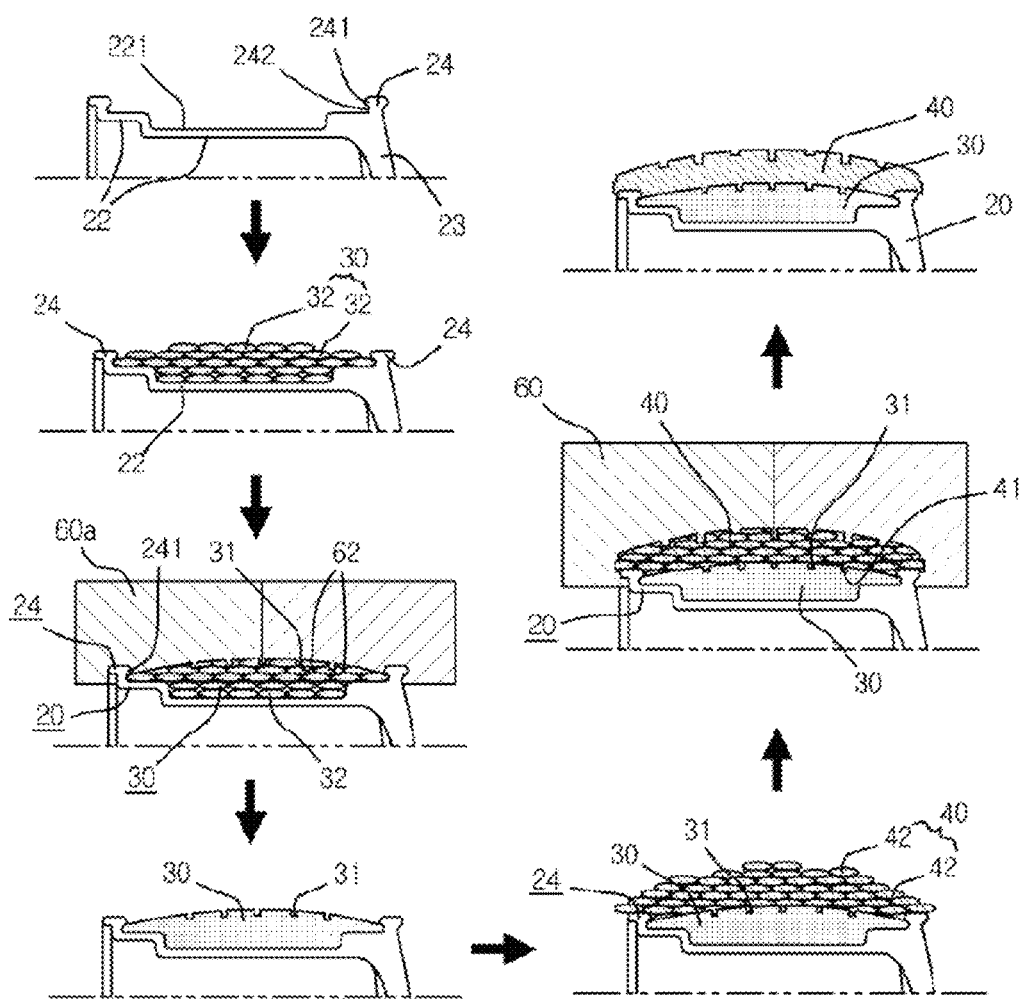

Referring to FIGS. 9 and 10, the method of manufacturing the tire according to the second embodiment of the present invention includes the steps of: manufacturing a wheel; forming an elastic layer; firstly curing the elastic layer; forming a tread layer; and secondly curing the tread layer, in which the elastic layer and tread layer are respectively cured in order to form multi-layers.

1) The process of manufacturing the wheel is achieved in the same manner as that of the first embodiment of the present invention.

2) In the process of forming the elastic layer, an elastic strip or sheet made from a non-cured elastic rubber material is wound on an outer peripheral surface of the rim 22 of the produced wheel to form a non-cured elastic layer 30. Further, as described below, it is possible to wind an elastic strip or sheet, which is made from urethane or polypropylene which is a different material from that of a tread, in order to form the non-cured elastic layer. At that time, the non-cured elastic layer is formed in such a manner that the elastic strip 32 is wound adjacent to only lower portions of the protrusions 241 of the rim flanges extending from both sides of the rim while covering on the center portion of the rim convexly, so that the both sides and the center portion of the elastic layer 30 have a different thickness, respectively.

3) The first curing process is performed in which a mold 60a is coupled to the wheel 20 and heated after the non-cured elastic strip is wound on the wheel to form the elastic layer. In this process, a curing operation is only achieved by heating the non-cured elastic layer 30. However, the first curing process may further include a step of forming a plurality of intersection grooves 31 on the outer peripheral surface of the elastic layer 30 using the mold having a plurality of protrusions 62 on the inner surface thereof. Furthermore, it takes a shorter time than a general curing process to cure the elastic layer so that the elastic layer is partially cured instead of being completely cured. Then, the elastic layer is entirely cured through the second curing process.

4) A process is performed of forming the tread layer 40, which is not cured, on an upper surface of the cured elastic layer. In the process, a non-cured tread strip 42 or sheet is wound on the wheel to cover the upper surface of the elastic layer 30 and the rim flanges 24, thereby forming the non-cured tread layer 40.

The process of forming the tread layer may further include a step of inserting or winding a steel or fabric structure in the same manner as the first embodiment before the tread rubber is wound. Then, the tread rubber is wound in such a manner that the structure is positioned at an intermediate portion of the tread layer, thereby improving the structural strength of the tire.

5) After the non-cured tread layer 40 is formed, the second curing process is performed of curing the tread layer 40 using a mold 60 different from that used in the first curing process. In this process, the non-cured tread layer 40 is cured while the mold 60 is coupled and heated to the wheel. At the same time, it is possible to completely cure the elastic layer 30 which is partially cured in the first curing process.

The method of the present invention further includes a step of forming an intersection portion, in which the tread rubber forming the tread layer is inserted into the intersection grooves 31 formed on the outer peripheral surface of the elastic layer in order to form the intersection protrusions 41, if the process has been achieved of forming the intersection grooves 31 on the outer peripheral surface of the elastic layer. Then, when the molds are removed, the manufacturing of the tire integrated with the wheel is accomplished in which connection surface between the tread layer and the elastic layer increases.

In the method of manufacturing the tire integrated with the wheel, it is possible to simplify manufacturing processes since the elastic layer and the tread layer are directly formed on the wheel. Furthermore, it is possible to provide even quality of the products by solving the problem in that the quality of the products is uneven due to product tolerance during the conventional coupling of a plurality of semi-products.

Although several exemplary embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A non-pneumatic tire integrated with a wheel, comprising:
   the wheel coupled to an axle of a vehicle and having rim flanges formed at both sides of an outer peripheral surface of a rim, respectively;
   an elastic layer formed on the rim of the wheel; and
   a tread layer formed to contact a road, in which the elastic layer is covered with the tread layer;
   wherein rim flanges are oppositely formed at both sides of the rim and have protrusions respectively extending in a widthwise direction from the rim flanges, supporting grooves are formed between the protrusions and a rim surface, and the elastic layer is formed between the supporting grooves on an outer peripheral surface of the rim.

2. The non-pneumatic tire integrated with the wheel according to claim 1, wherein the elastic layer is formed of one type of material or at least two types of materials selected from the group consisting of urethane, polypropylene, and elastic rubber.

3. The non-pneumatic tire integrated with the wheel according to claim 1, wherein the elastic layer and the tread layer are convexly formed to protrude outwardly at the center portion of the rim.

4. The non-pneumatic tire integrated with the wheel according to claim 1, further comprising an intersection portion for increasing a connection surface between the elastic layer and the tread layer, which includes intersection grooves formed on an upper surface of the elastic layer and having one of grid, diagonal, wave and cylindrical shapes, and intersection protrusions formed on a lower surface of the tread layer contacting surface to surface with the elastic layer and corresponding to the intersection grooves.

5. A method for manufacturing a non-pneumatic tire integrated with a wheel, comprising the steps of:
   producing a wheel in which a rim groove is formed at a center portion of a rim and has a reduced diameter, in which rim flanges are respectively formed at both sides of the rim and respectively have protrusions oppositely formed thereon, and in which a supporting rim is formed between the protrusions and the rim;
   forming multi-layers of an elastic layer and a tread layer, in which the non-cured elastic layer is formed to a lower portion of the protrusions of the rim flanges of the wheel, and the non-cured tread layer is formed to cover an upper surface of the elastic layer and the rim flanges; and
   curing the non-cured multi-layers in a mold.

6. The method for manufacturing the non-pneumatic tire integrated with the wheel according to claim 5, further comprising a step of inserting a steel or fabric structure in the tread layer in order to reinforce the tire.

7. A method for manufacturing a non-pneumatic tire integrated with a wheel, comprising the steps of:
   producing a wheel in which a rim groove is formed at a center portion of a rim and has a reduced diameter, in which rim flanges are respectively formed at both sides of the rim and respectively have protrusions oppositely formed thereon, and in which a supporting rim is formed between the protrusions and the rim;
   forming a non-cured elastic layer to a lower portion of the protrusions of the rim flanges of the wheel;
   firstly curing the non-cured elastic layer in a mold;
   forming a non-cured tread layer to cover an upper surface of the cured elastic layer and the rim flanges; and
   secondly curing the non-cured tread layer in a mold.

8. The method for manufacturing the non-pneumatic tire integrated with the wheel according to claim 7, comprising a step of forming an intersection portion capable of increasing a contact area between the elastic layer and the tread layer, wherein the first curing process includes a step of forming a plurality of intersection grooves on an outer peripheral surface of the elastic layer using a plurality of protrusions formed on an inner surface of the mold and wherein the second curing process includes a step of forming intersection protrusions in such a manner that rubber of the non-cured tread layer is inserted into the intersection grooves of the elastic layer.

9. The method for manufacturing the non-pneumatic tire integrated with the wheel according to claim 7, further comprising a step of inserting a steel or fabric structure in the tread layer in order to reinforce the tire.

10. A non-pneumatic tire integrated with a wheel, comprising:
    the wheel coupled to an axle of a vehicle and having rim flanges formed at both sides of an outer peripheral surface of a rim, respectively;
    an elastic layer formed on the rim of the wheel; and
    a tread layer formed to contact a road, in which the elastic layer is covered with the tread layer;
    wherein the rim of the wheel has a rim groove formed with a diameter that is smaller than that of the outer peripheral surface of the rim, and a part of the elastic layer is inserted in the rim groove on the rim, so as to improve a transverse supporting force of the elastic layer.

11. The non-pneumatic tire integrated with the wheel according to claim 10, wherein the elastic layer is formed of one type of material or at least two types of materials selected from the group consisting of urethane, polypropylene, and elastic rubber.

12. The non-pneumatic tire integrated with the wheel according to claim 10, wherein the elastic layer and the tread layer are convexly formed to protrude outwardly at the center portion of the rim.

13. The non-pneumatic tire integrated with the wheel according to claim 10, further comprising an intersection portion for increasing a connection surface between the elastic layer and the tread layer, which includes intersection grooves formed on an upper surface of the elastic layer and having one of grid, diagonal, wave and cylindrical shapes, and intersection protrusions formed on a lower surface of the tread layer contacting surface to surface with the elastic layer and corresponding to the intersection grooves.

* * * * *